US012601319B2

(12) United States Patent
Ryon et al.

(10) Patent No.: US 12,601,319 B2
(45) Date of Patent: Apr. 14, 2026

(54) AIRBLAST FUEL INJECTORS

(71) Applicant: Collins Engine Nozzles, Inc., Des Moines, IA (US)

(72) Inventors: Jason A. Ryon, Carlisle, IA (US); Brandon P. Williams, Johnston, IA (US); Andy W. Tibbs, Earlham, IA (US)

(73) Assignee: Collins Engine Nozzles, Inc., Des Moines, IA (US)

(*) Notice: Subject to any disclaimer, the term of this patent is extended or adjusted under 35 U.S.C. 154(b) by 331 days.

(21) Appl. No.: 18/225,844

(22) Filed: Jul. 25, 2023

(65) Prior Publication Data

US 2025/0035079 A1 Jan. 30, 2025

(51) Int. Cl.

| | |
|---|---|
| ***F23R 3/28*** | (2006.01) |
| ***F02M 53/08*** | (2006.01) |
| ***F23R 3/14*** | (2006.01) |

(52) U.S. Cl.

CPC ............... *F02M 53/08* (2013.01); *F23R 3/14* (2013.01); *F23R 3/283* (2013.01)

(58) Field of Classification Search

CPC .... F23R 3/14; F23R 3/28; F23R 3/283; F23R 3/286; F23R 3/04; F23R 3/60; F23R 2900/03042; F02C 9/263

See application file for complete search history.

(56) References Cited

U.S. PATENT DOCUMENTS

| | | | | |
|---|---|---|---|---|
| 3,912,164 | A | 10/1975 | Lefebvre et al. | |
| 4,216,652 | A | 8/1980 | Herman et al. | |
| 4,327,547 | A | 5/1982 | Hughes et al. | |
| 5,020,329 | A | 6/1991 | Ekstedt et al. | |
| 5,873,237 | A | 2/1999 | Medla et al. | |
| 7,942,003 | B2 * | 5/2011 | Baudoin | F23R 3/343 60/752 |
| 8,286,433 | B2 | 10/2012 | Piper et al. | |
| 9,228,741 | B2 * | 1/2016 | Buelow | F23R 3/346 |
| 9,791,153 | B2 | 10/2017 | Dai et al. | |
| 11,131,458 | B2 | 9/2021 | Prociw et al. | |
| 2006/0207258 | A1 * | 9/2006 | Tanner | F23R 3/14 60/740 |
| 2007/0163263 | A1 | 7/2007 | Thomson | |
| 2011/0031333 | A1 * | 2/2011 | Short | F23R 3/28 239/548 |
| 2012/0073301 | A1 * | 3/2012 | Paradise | F02C 7/232 60/746 |

(Continued)

FOREIGN PATENT DOCUMENTS

EP 3156732 A1 4/2017

OTHER PUBLICATIONS

Extended European Search Report for EP Application No. 24190934.0, dated Oct. 25, 2024, 9 pages.

*Primary Examiner* — Thuyhang N Nguyen

(74) *Attorney, Agent, or Firm* — Kinney & Lange, P.A.

(57) ABSTRACT

An airblast fuel injector assembly for a gas turbine engine is disclosed, which includes an annular air swirler and a fuel injector, wherein the annular air swirler includes a main body, an inner air cooler, an inner air swirler and a prefilmer, and wherein the fuel injector includes a feed tube, which has at least one fuel tip projecting through a respective reception hole formed in the annular wall of the main body radially outboard from the inner air swirler.

19 Claims, 6 Drawing Sheets

(56) References Cited

U.S. PATENT DOCUMENTS

| | | | | |
|---|---|---|---|---|
| 2013/0219911 | A1* | 8/2013 | Dudebout | F02C 7/26 60/778 |
| 2014/0075949 | A1* | 3/2014 | Prociw | F23R 3/346 239/557 |
| 2017/0108223 | A1* | 4/2017 | Ryon | F23R 3/12 |
| 2017/0218845 | A1* | 8/2017 | Snyder | F23R 3/283 |
| 2019/0309949 | A1 | 10/2019 | Prociw et al. | |

* cited by examiner

AIRBLAST FUEL INJECTORS

BACKGROUND OF THE DISCLOSURE

1. Field of the Disclosure

This disclosure relates to fuel injectors and more particularly to airblast fuel injector assemblies and line-replaceable multipoint injector arrays for gas turbine engines.

2. Description of Related Art

There is a need for improved thermal isolation of the fuel circuits within fuel injectors for gas turbine engines. The thermal environment that the injectors reside in continues to increase. The temperature of incoming fuel to injectors is also increasing. Improved thermal management is necessary to protect the fuel from overheating, which causes the fuel to deteriorate and can potentially form carbon deposits within the fuel circuit.

Airblast injectors have many advantages over pressure atomizer fuel injectors, however even with heat shielding, airblast injectors have a larger fuel circuit surface area exposed to high temperatures. This larger surface area makes it harder to design the fuel injectors to withstand the thermal load and protect the fuel from coking.

Multipoint injection schemes have been shown to reduce engine emissions and improve temperature distribution among other advantages. However, it is difficult to distribute fuel to a large number of fuel injectors. Traditional approaches have included internal fuel manifolds, however the problem exists that internal fuel manifolds are not line replaceable for maintenance, such as cleaning or replacement for durability. Traditional methods would require a major engine overhaul to be able to extract an internal fuel manifold. It would be advantageous for fuel injectors to be line-replaceable.

Such conventional methods and systems have generally been considered satisfactory for their intended purpose. However, there is still a need in the art for improved thermal management within airblast injectors as well as multipoint injection schemes that are line-replaceable. The present disclosure provides a solution for this need.

SUMMARY OF THE DISCLOSURE

The subject disclosure is directed to a new and useful airblast fuel injector assembly for a gas turbine engine. The airblast fuel injector has an annular air swirler with a main body having a rear end wall defining a central axis of the annular air swirler, and a radially outwardly expanding conical wall portion extending downstream from the rear end wall. The annular air swirler further includes an inner air cooler formed in the rear end wall of the main body portion. The inner air cooler can further include a plurality of circumferentially spaced apart cooling holes surrounding the central axis of the air swirler.

The annular air swirler further includes an inner air swirler formed in an annular wall of the main body radially outboard from the conical wall portion. The inner air swirler can further include a plurality of circumferentially spaced apart swirl holes. There is a prefilmer radially outboard from the inner air swirler and it includes a circumferential prefilming surface extending downstream from the inner air swirler, wherein the prefilming surface has a circumferential internal fuel passage formed therein. The circumferential inner fuel passage shelters the fuel briefly from the air issuing from inner air swirler allowing the fuel to distribute circumferentially around the prefilmer before it meets with high velocity air issued from the inner air swirler.

The airblast fuel injector assembly further includes a fuel injector with a feed tube having at least one fuel tip projecting through a respective reception hole formed in the annular wall of the main body radially outboard from the inner air swirler, wherein each fuel tip has a fuel port positioned to direct fuel tangentially into the internal fuel passage in the prefilming surface.

In one embodiment, the reception holes extend axially through the annular wall of the main body. In another embodiment, the reception holes extend radially through the annular wall of the main body.

In certain embodiments of the disclosure, the feed tube has three fuel tips, each having a respective reception hole that extends axially through the annular wall of the main body. In certain embodiments, the fuel injector includes an outer heat shield surrounding the feed tube. A stagnant air gap exists between the heat shield and the feed tube.

In certain embodiments, the airblast fuel injector assembly further includes an outer air cap surrounding the annular air swirler so as to define an outer air passage between the prefilmer and the outer air cap. In certain embodiments, the outer air cap is connected to the annular air swirler. In certain embodiments, the outer air cap is formed integral with the annular air swirler. The outer air cap is attached to a combustor liner of the gas turbine engine either directly, using a floating collar, or by way of a burner seal. In certain embodiments, the reception hole in the annular wall of the main body has a lead-in chamfer or fillet which allows the fuel tip to be easily inserted therein.

The subject disclosure is also directed to a fuel injector array for a gas turbine engine which is configured for multipoint fuel injection and includes a plurality of airblast fuel injector assemblies as described above. The annular air swirler of each airblast fuel injector assembly is fed fuel from a respective feed tube. A plurality of feed tubes are connected together along a common feed arm.

In certain embodiments, the fuel injector array further includes a scheduling valve operatively associated with an inlet fitting of the feed arm for allowing fuel to feed into different groups of feed tubes connected to the feed arm at different points of engine operation. The scheduling valve is adapted and configured to allow fuel to feed into a first group of feed tubes during an ignition stage. The scheduling valve is also adapted and configured to allow fuel to feed into a second group of feed tubes during an idle stage. The scheduling valve is also adapted and configured to allow fuel to feed into a third group of feed tubes during high power conditions, for example, a cruise and/or takeoff stage.

In certain embodiments the fuel injector array includes a thermal management system that defines a cooling loop through the common the feed arm. In addition, the feed tubes and the common feed arm are all surrounded by respective outer heat shields. These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
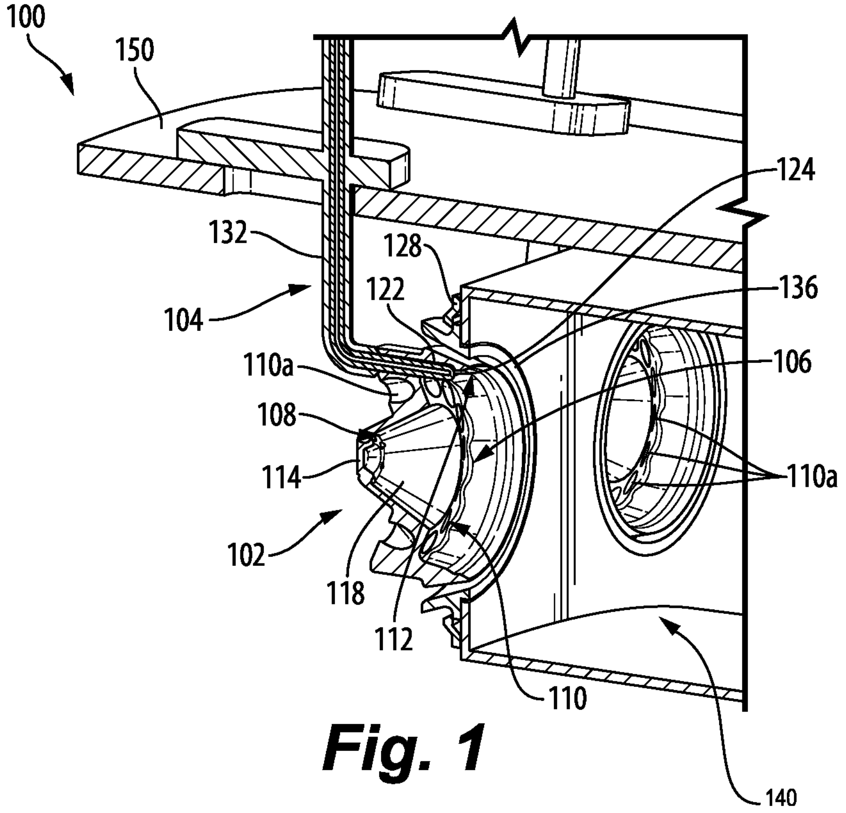
FIG. 1 is a perspective view in cross-section of an engine casing of a gas turbine engine illustrating an airblast fuel injector assembly of the subject disclosure in an installed position.

Referring now to the drawings wherein like reference numerals identify similar structural features or aspects of the subject disclosure, there is shown in FIG. 1 an engine casing designated generally by reference numeral 150, which includes a plurality of airblast fuel injector assemblies 100 constructed in accordance with an embodiment of the subject disclosure that is designed to improve thermal isolation within a gas turbine engine.

Figure 2:
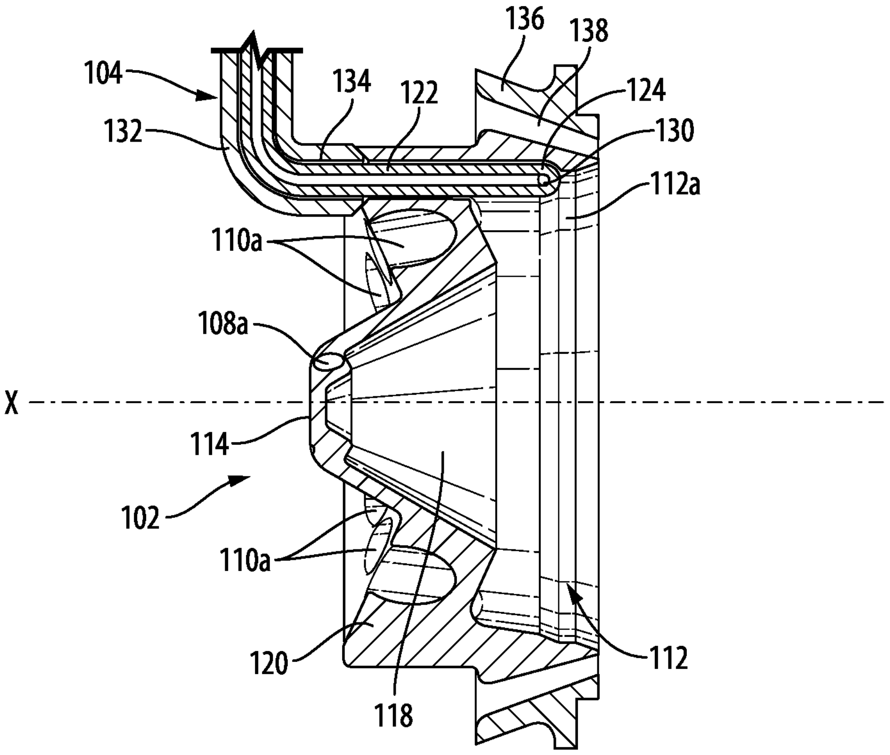
FIG. 2 is a side elevational view in cross-section of the airblast fuel injector assembly of FIG. 1, showing a fuel injector axially inserted into an annular wall of a main body of an annular air swirler.

With reference to FIGS. 1 and 2, an airblast fuel injector assembly 100 includes an annular air swirler 102 and a fuel injector 104. The annular air swirler 102 can be one machined or cast component or an assembly of separate components that are joined together. The annular air swirler 102 includes a main body 106, an inner air cooler 108, an inner air swirler 110, and a prefilmer 112. The main body 106 has a rear end wall 114 defining a central axis "X" of the annular air swirler 110, and a radially outwardly expanding conical wall portion 118 that extends downstream from the rear end wall 114.

Figure 3:
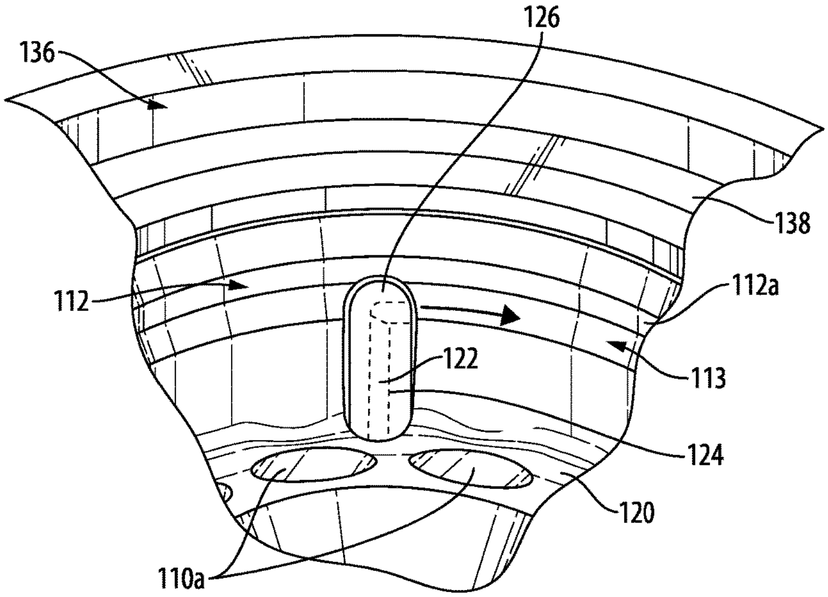
FIG. 3 is an enlarged localized perspective view of the airblast fuel injector assembly of FIG. 1, showing a fuel tip of a feed tube of the fuel injector projecting through a respective reception hole formed in the annular wall of the main body.
Figure 6:
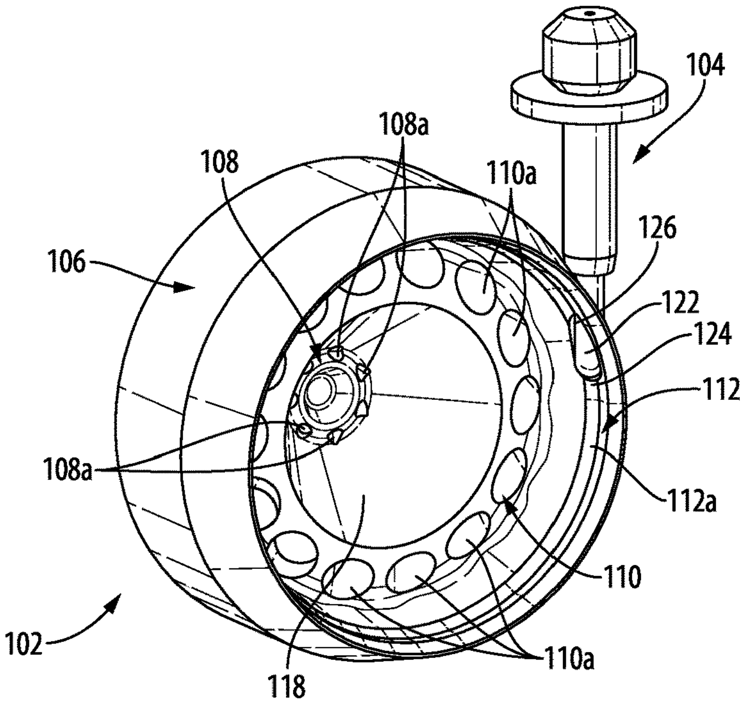
FIG. 6 is a perspective view of an embodiment of an airblast injector assembly in accordance with the subject disclosure, wherein the fuel tip is inserted radially in a respective reception hole within the annular wall of the main body of the annular air swirler.

With continuing reference to FIG. 2, the inner air cooler 108 is formed in the rear end wall 114 of the main body portion 106 and includes a plurality of circumferentially spaced apart cooling holes 108*a*, which are best shown in FIG. 6. The cooling holes 108*a* surround the central axis X. The inner air cooler 108 facilitates cooling of the components of the main body 106 of the annular air swirler 102, particularly the cooling of the conical wall portion 118. The inner air swirler 110 is formed in an annular wall 120 of the main body 106, radially outboard from the conical wall portion 118. It includes a plurality of circumferentially spaced apart swirl holes 110*a*. The temperature of the incoming air, e.g., compressor discharge air, is hot enough to burn off residual carbon that may grow on the air swirler at most conditions (e.g., takeoff and cruise). The prefilmer 112 is radially outboard from the inner air swirler 110 and it includes a circumferential prefilming surface 112*a* that extends downstream from the inner air swirler 110. The prefilming surface 112*a* has a circumferential internal fuel passage 113 formed therein, e.g., as best seen in FIG. 3, (e.g., the circumferential internal fuel passage is a groove and/or recess which allows fuel to spread circumferentially along the prefilming surface 112*a*). The circumferential inner fuel passage shelters the fuel briefly from the air issuing from inner air swirler 110 allowing the fuel to distribute circumferentially around the prefilmer 112 before it meets with high velocity air issued from the inner air swirler 110.

Figure 9:
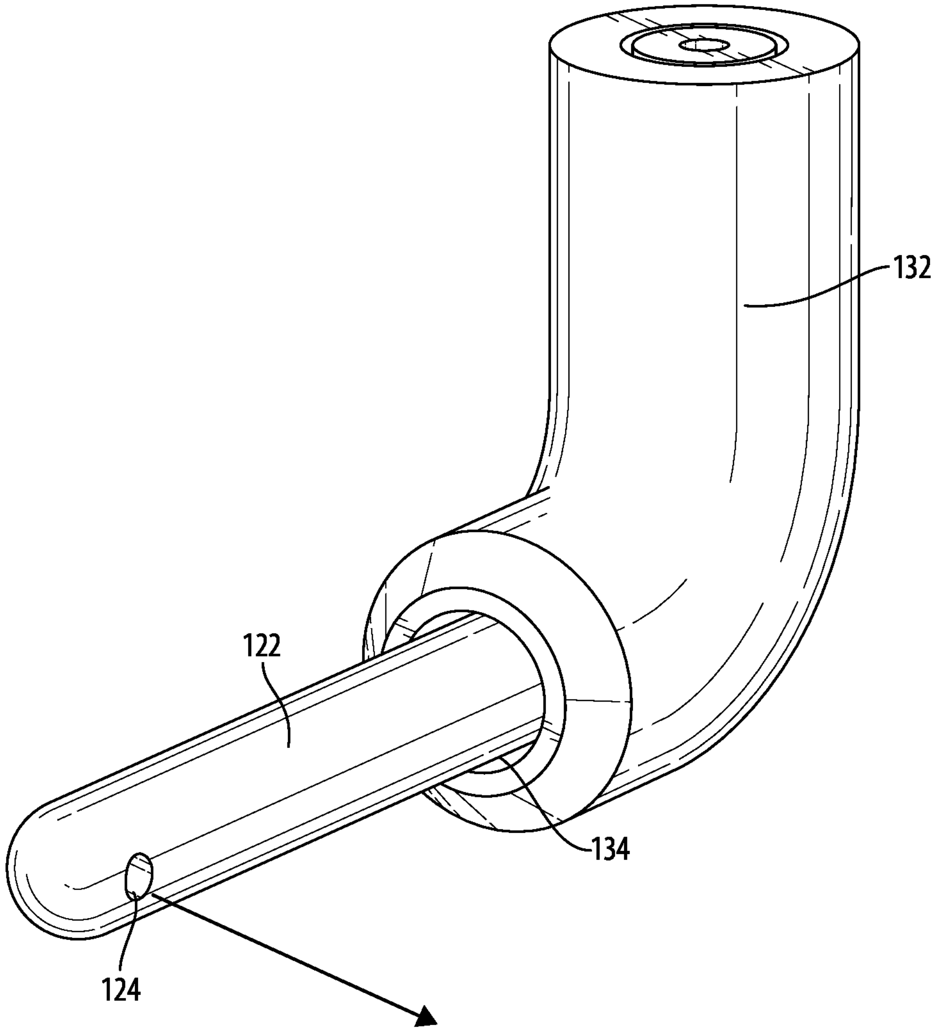
FIG. 9 is perspective view of the fuel injector of the airblast fuel injector assembly of FIG. 1, showing a fuel port a fuel tip of the fuel injector.

With reference to FIGS. 2 and 3, the fuel injector 104 includes a feed tube 122 which can have at least one fuel tip 124 projecting through a respective reception hole 126 formed in the annular wall 120 of the main body 106, radially outboard from the inner air swirler 110. Each fuel tip 124 has a fuel port 130 positioned to direct fuel tangentially into the internal fuel passage 113 in the prefilming surface 112*a* (see also FIG. 9). The fuel tip 124 and feed tube 122 can be one machined piece or they can be separately formed and joined together with conventional means such as by brazing or the like.

With reference to FIG. 3, the feed tube 122 is shown in an installed position, inserted within the reception hole 126. The fuel tip 124 is shown axially aligned with the prefilming surface 112*a*. In this embodiment, the reception holes 126 extend axially through the annular wall 120 of the main body 106, so that the fuel flows tangentially into the circumferential internal fuel passage 113 in the prefilming surface 112*a*. In another embodiment shown in FIG. 6, the reception holes 126 extend radially through the annular wall 120 of the main body 106, so that the fuel flows tangentially into the circumferential internal fuel passage 113 in the prefilming surface 112*a*.

Figure 4:
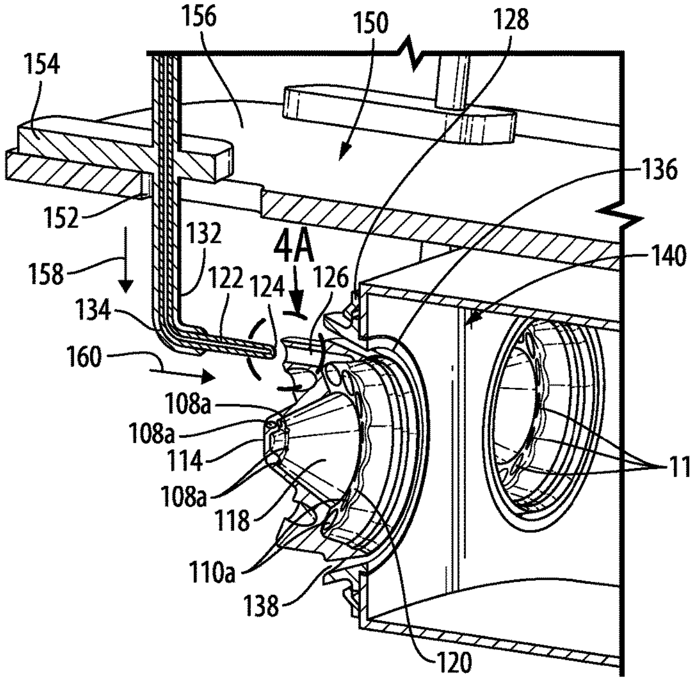
FIG. 4 is a perspective view similar to FIG. 1, wherein the fuel injector feed arm is inserted radially into the engine casing and axially into the respective reception hole formed in the annular wall of the main body of the annular air swirler.

With reference to FIG. 4, the fuel injector 104 is installed by radially inserting the fuel injector 104 into a gas turbine engine case 150. As shown by directional arrow 158 in FIG. 4, the fuel injector 104 is radially inserted through an outer wall 156 of the engine casing and through a casing inlet hole 152. Fuel injector flange 154 seals air pressure within the engine case 150. Once the fuel injector 104 is inserted radially into the engine casing 150, it is then inserted axially into the reception hole 126 of the airblast assembly 102, as shown by directional arrow 160 in FIG. 4. The fuel tip 124 is aligned with the reception hole 126, and the fuel injector 104 axially slides forward into the reception hole 126, thereby engaging the fuel tip 124 within the annular air swirler 102. The feed tube 122 of the fuel injector 104 is removed from the reception hole 126 just as it is inserted, facilitating ease of replacement of the part, without having to deconstruct the engine.

The main body 106 of the annular air swirler 102 is configured to rotate within the floating collar 128, in order to align the fuel injector feed tube 122 with the reception hole 126 for easier insertion. The fuel injector 104 is welded directly to the engine case 150 by way of flange seals, for example.

Figure 5:
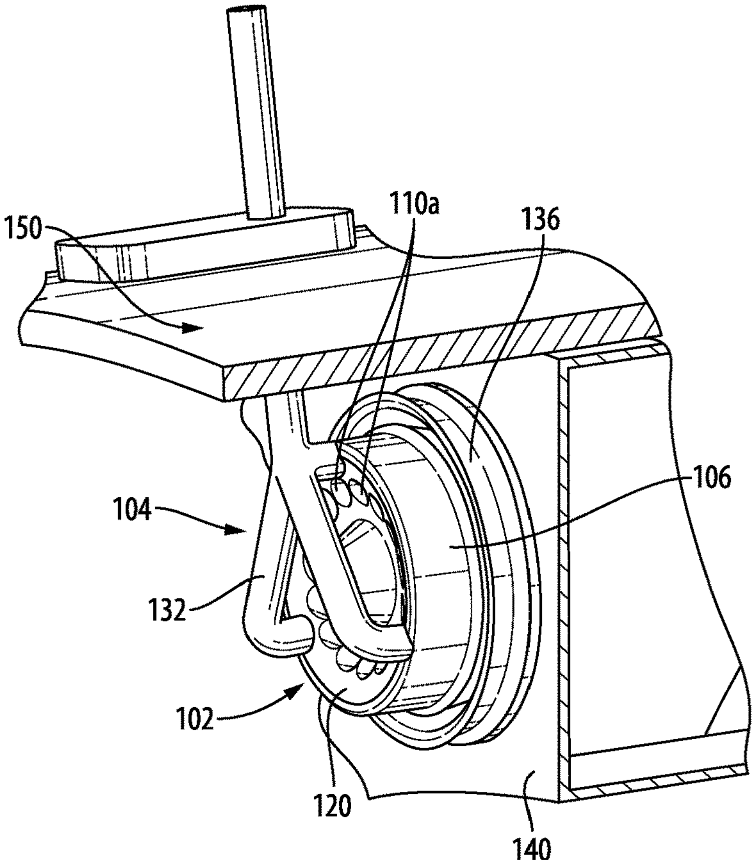
FIG. 5 is a perspective view of an embodiment of an airblast fuel injector assembly which includes three feed tubes inserted within respective reception holes formed in the annular wall of the main body of the annular air swirler.

With reference to FIG. 5, there is illustrated a feed tube 122 that has three fuel tips 124 (e.g., each of the fuel tips 124 are shown from an upstream position and are within respective reception holes). Those skilled in the art will readily appreciate that various numbers of fuel tips 124 can be incorporated into the annular air swirler to increase the fuel distribution within the annular air swirler 102. The multiple fuel tips 124 have separate inlet fuel circuits which can each have different flow rates. There can be separate fuel circuits, e.g., pilot and main fuel, for example, into the same fuel injector 104. Each fuel tip 124 has a respective reception hole 126 that extends axially through the annular wall 120 of the main body 106.

Preferably, the fuel injector 104 includes an outer heat shield 132 surrounding the feed tube 122. A stagnant air gap 134 exists between the heat shield 132 and the feed tube 122, as best seen in FIG. 2. The heat shield 132 is closely fit to the annular air swirler 102 to reduce vibrational stress and wear on the feed tube 122. The stagnant air gap 134 isolates the feed tube 122 from high velocity hot air. The stagnant air gap 134 limits the amount of heat into the fuel circuit to prevent excessive internal wall temperatures. The stagnant air gap 134 prevents high temperatures from causing the fuel to degrade and cause internal carbon within the fuel passages and deteriorate performance.

Figure 4A:
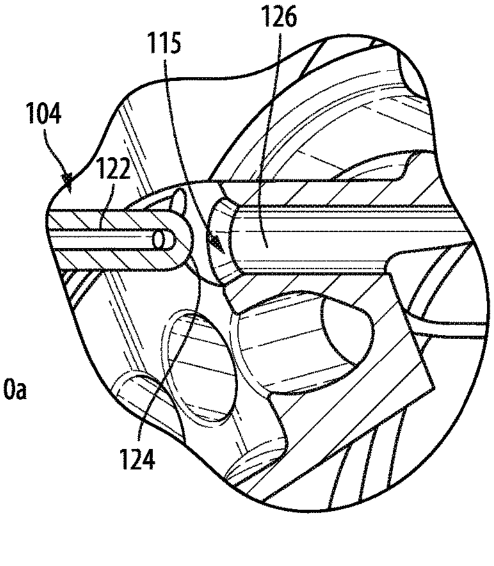
FIG. 4A is an enlarged localized perspective view of the airblast injector assembly of FIG. 1, showing a lead in chamfer/fillet within a reception hole of the annular air swirler.

In certain embodiments, the airblast fuel injector assembly 100 further includes an outer air cap 136 surrounding the annular air swirler 102 so as define an outer air passage 138 between the prefilmer 112 and the outer air cap 136. In certain embodiments, the outer air cap 136 can be connected to the annular air swirler 102. The outer air passage 138 can be defined by a traditional air cap brazed onto outer air vanes, e.g., straight or swirl vanes, drilled holes, sliding alignment standoffs, or any other suitable manner of making airblast injectors. In certain embodiments, the outer air cap 136 can be formed integral with the annular air swirler 102, e.g., as one machined piece. The outer air cap 136 is attached to a combustor liner 140, e.g., as shown in FIGS. 1 and 4-5, of the gas turbine engine, either directly, e.g., by way of vanes, using a floating collar, or by way of a burner seal. In certain embodiments, the reception hole 126 in the annular wall 120 of the main body 106 has a lead-in chamfer or fillet 115 which allows the fuel tip 124 to be easily inserted therein (e.g., as best shown in FIG. 4A).

In certain embodiments, the above described airblast fuel injector assembly 100 reduces the surface area of the fuel circuit and limits heat transfer into the fuel. The feed tube 122 and annular air swirler 102 components reduce the overall cost and part count of the assembly. The arrangement of the fuel injector assembly 100 allows for easy replacement of the feed tubes 122.

Figure 7:
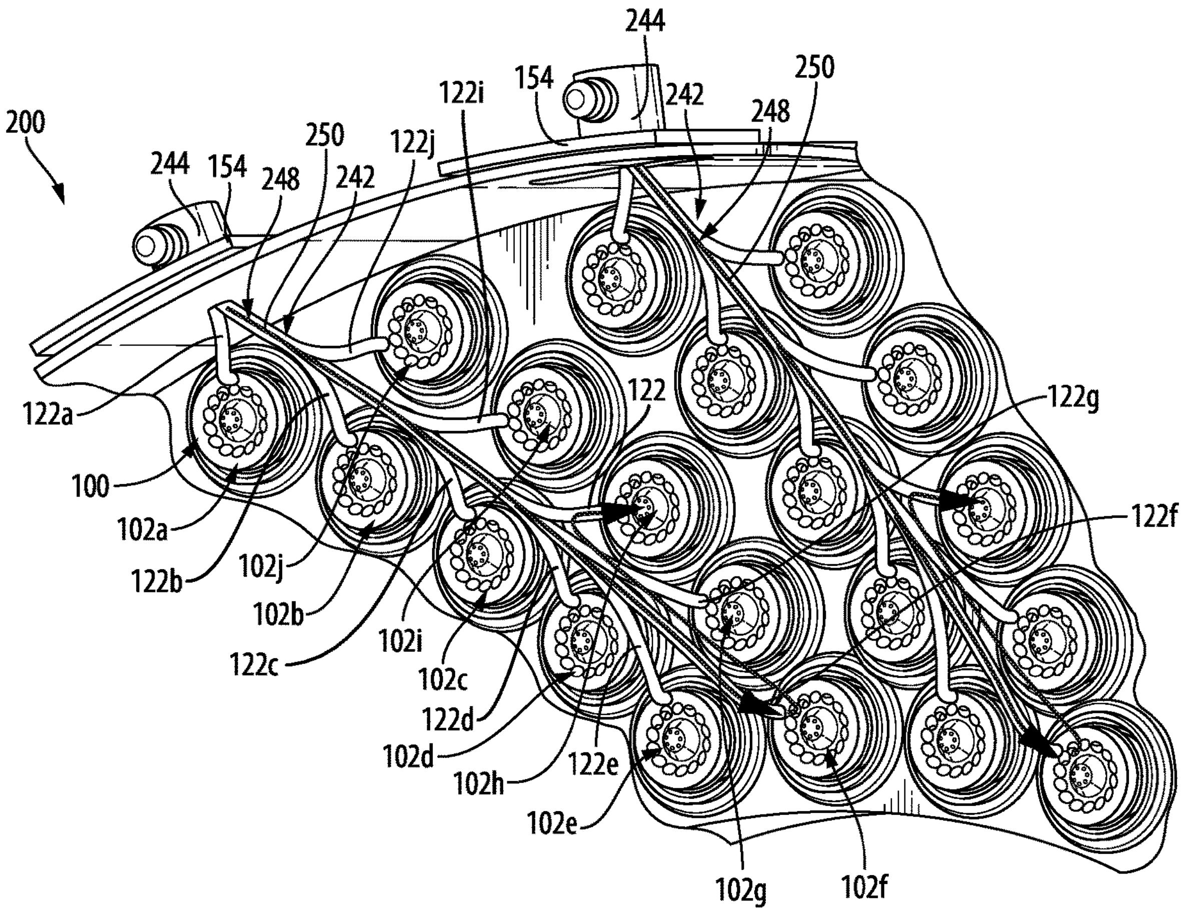
FIG. 7 is a perspective view of a section of an engine casing of a gas turbine engine configured for multipoint fuel injection which includes an array of airblast fuel injector assemblies of the subject disclosure and wherein a common feed arm supplies fuel to a plurality of feed tubes.
Figure 8:
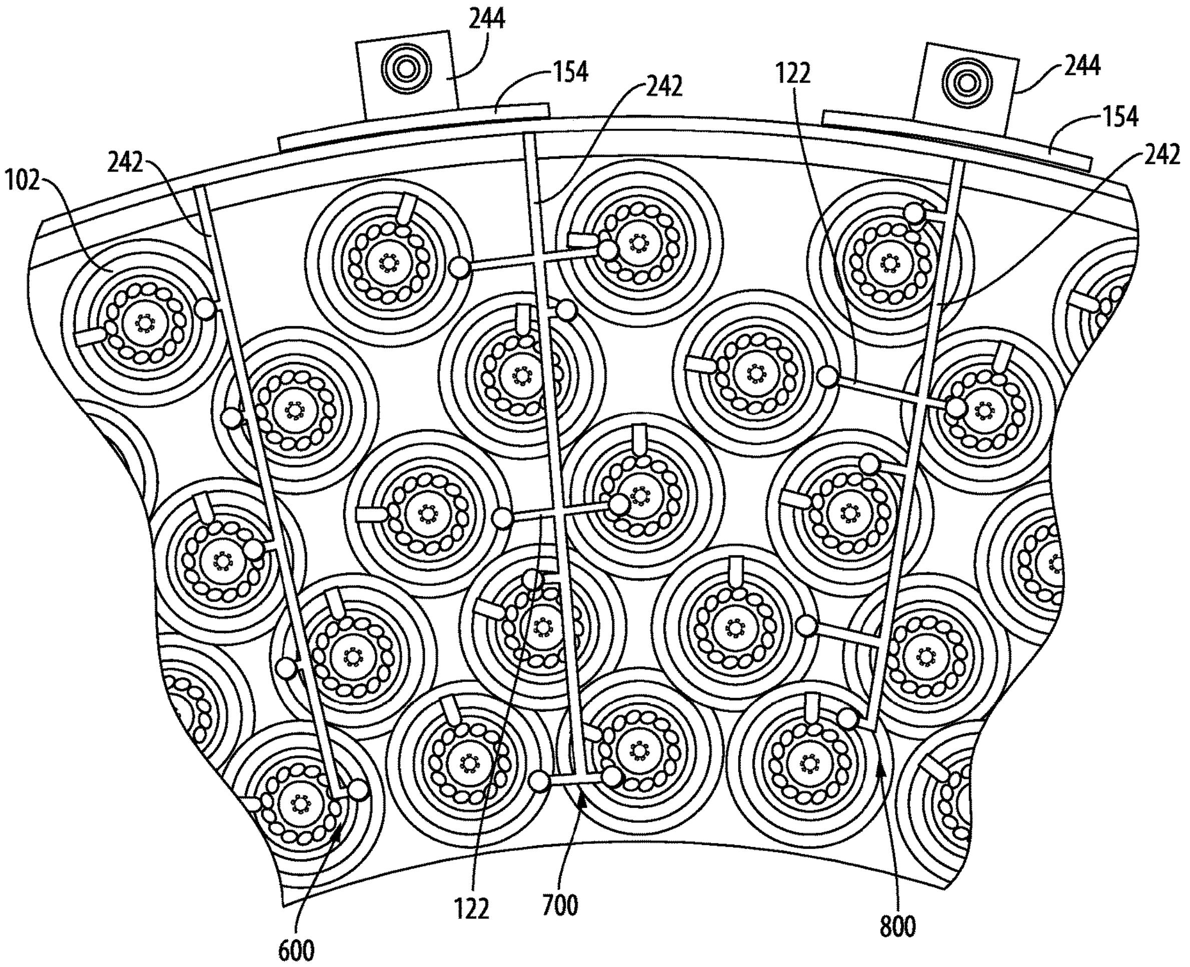
FIG. 8 is a front elevational view of the section of an engine casing of a gas turbine engine configured for multipoint fuel injection which includes an array of airblast fuel injector assemblies of FIG. 7, illustrating different feed arm arrangements each configured to feed fuel to a different number of airblast injector assemblies.

With reference to FIGS. 7 and 8, there is illustrated a fuel injector array 200 for a gas turbine engine configured for multipoint fuel injection, which includes a plurality of airblast fuel injector assemblies 100, as described above. By way of example, a grouping or set of annular air swirlers 102*a*-102*j* is fed fuel from respective feed tubes 122*a*-122*j* by way of respective fuel tips 124*a*-124*j*. The plurality of feed tubes 122*a*-122*j* are connected together along a common feed arm 242. By way of example, each fuel injector array 200 can include ten fuel injector tips 124, or any other suitable number of fuel injector tips or arrangement. The fuel is then injected into the air blast injector assembly 100, which creates a film of fuel and is burned with the air to produce heat for the gas turbine engine.

With continued reference to FIGS. 7 and 8, an array 200 can include seven or eight fuel tips 124 and air swirler assemblies 100, which provides the advantage of shorter feed tubes 122, thereby reducing stress, e.g., as shown by arrays 700 and 800 in FIG. 8. The arrays can be arranged in a manner which results in a smaller casing inlet hole 152 in the gas turbine engine case 150 for the array to be removed (e.g., a five fuel tip array that is arranged vertically, e.g., as shown by array 600 in FIG. 8). Each array 200 within a gas turbine engine casing can be uniform or alternatively, each array can have different arrangements entirely.

In certain embodiments, the fuel injector array 200 further includes a scheduling valve 244 operatively associated with the fuel injector flange 154 of the feed arm 242 for allowing fuel to feed into different groups of feed tubes 122*a*-122*j* at different points of engine operation. The scheduling valve 244 is located near the inlet of the fuel injector feed tube 122. The scheduling valve 244 allows the fuel to enter different stages at different points of engine operation.

For example, the scheduling valve 244 may be adapted and configured to allow fuel to feed into a first group of feed tubes 122 during an ignition stage, e.g., through airblast fuel injector assemblies 102*a*-102*c* of FIG. 7. The scheduling valve 244 may be further adapted and configured to allow fuel to feed into a second group of feed tubes 122 during an idle stage, e.g., through airblast fuel injector assemblies 102*d*-102*g* in FIG. 7. The scheduling valve 244 may also be adapted and configured to allow fuel to feed into a third group of feed tubes 122 during a cruise and/or takeoff stage, e.g., through airblast fuel injector assemblies 102*h*-102*j*.

In certain embodiments the fuel injector array 200 further includes a thermal management system 248. The thermal management system 248 includes a cooling loop 250 through the common feed arm 242. The thermal management system 248 is included by using the pilot fuel stage flow in proximity to the other fuel stages. This allows the pilot fuel which is continuously flowing with cool fuel to keep the other fuel elements cool, even when their fuel is not flowing. Depending on the cooling needed, the pilot fuel can be primarily in the feed tubes 122*a*-122*j* or it can cool all the way to the fuel tips 124*a*-124*j* (e.g., each of the fuel tips 124*a*-124*j* are shown from an upstream position and are within respective reception holes). Once the pilot fuel is delivered either to the main part of each feed tube 122*a*-122*j* or to each fuel tip 124*a*-1224*j*, it then returns to be injected into the pilot stage annular air swirlers 102*a*-102*j*.

In certain embodiments, the plurality of feed tubes 122*a*-122*j* and the common feed arm 242 are all be surrounded by respective outer heat shields 132, each forming respective stagnant air gaps 134 as described above. In certain embodiments, each scheduling valve 244 is integral with the fuel injector assembly and attached in place to the gas turbine engine case 150 using the fuel injector flange 154.

In certain embodiments, the arrangement of each array allows for the feed tubes 122*a*-122*j* to easily be replaced, maintained, and repaired, for example, in the event of internal fuel growth or reduced durability due to thermal erosion or fretting. The internal fuel scheduling vale 244 can allow for fuel staging for operability and injector arrays to be fed from a single external fuel manifold.

While the subject disclosure includes reference to certain embodiments, those skilled in the art will readily appreciate that changes and/or modifications may be made thereto without departing from the spirit and scope of the subject disclosure.

What is claimed is:

1. An airblast fuel injector assembly for a gas turbine engine comprising:

a) an annular air swirler including:
   i) a main body having a rear end wall defining a central axis of the annular air swirler, and a radially outwardly expanding conical wall portion extending downstream from the rear end wall;
   ii) an inner air cooler formed in the rear end wall of the main body portion;
   iii) an inner air swirler formed in an annular wall of the main body radially outboard from the conical wall portion;
   iv) a prefilmer radially outboard from the inner air swirler and including a circumferential prefilming surface extending downstream from the inner air swirler, wherein the prefilming surface has a circumferential internal fuel passage formed therein;

b) a gas turbine engine case including an outer wall and a casing inlet hole through the outer wall;

c) a fuel injector including a fuel injector flange and a feed tube mounted within the fuel injector flange, the feed tube having at least one fuel tip projecting through a respective reception hole formed in the annular wall of the main body radially outboard from the inner air swirler, each fuel tip having a fuel port positioned axially aligned with the circumferential prefilming surface and configured to direct fuel tangentially into the internal fuel passage in the prefilming surface, wherein the fuel injector flange seals the casing inlet hole, and the feed tube passes through the casing inlet hole.

2. The airblast fuel injector assembly of claim 1, wherein the inner air cooler includes a plurality of circumferentially spaced apart cooling holes surrounding the central axis.

3. The airblast fuel injector assembly of claim 1, wherein the inner air swirler includes a plurality of circumferentially spaced apart swirl holes.

4. The airblast fuel injector assembly of claim 1, wherein the reception holes extend axially through the annular wall of the main body.

5. The airblast fuel injector assembly of claim 1, wherein the reception holes extend radially through the annular wall of the main body.

6. The airblast fuel injector assembly of claim 1, wherein the feed tube has a plurality of fuel tips each having a respective reception hole that extends axially through the annular wall of the main body.

7. The airblast fuel injector assembly of claim 1, wherein the fuel injector includes an outer heat shield surrounding the feed tube, and wherein a stagnant air gap exists between the heat shield and the feed tube.

8. The airblast fuel injector assembly of claim 1, further comprising an outer air cap surrounding the annular air swirler so as define an outer air passage between the prefilmer and the outer air cap.

9. The airblast fuel injector assembly of claim 8, wherein the outer air cap is connected to the annular air swirler.

10. The airblast fuel injector assembly of claim 8, wherein the outer air cap is formed integral with the annular air swirler.

11. The airblast fuel injector assembly of claim 8, wherein the outer air cap is attached to a combustor liner of the gas turbine engine either directly, using a floating collar or by way of a burner seal.

12. The airblast fuel injector assembly of claim 1, wherein the reception hole in the annular wall of the main body has a lead-in chamfer or fillet which allows the fuel tip to be easily inserted therein.

13. A fuel injector array for a gas turbine engine configured for multipoint fuel injection comprising:

a plurality of airblast fuel injector assemblies as recited in claim 1, wherein the annular air swirler of each airblast fuel injector assembly is fed fuel from a respective feed tube, wherein a plurality of feed tubes are connected together along a common feed arm, the common feed arm being arranged perpendicular to the casing inlet hole, and wherein the plurality of feed tubes are arranged perpendicular to the common feed arm such that the annular air swirlers of each airblast fuel injector assembly is arranged vertically from the casing inlet hole radially inward towards a center of the main body.

14. A fuel injector array as recited in claim 13, further comprising a scheduling valve operatively associated with an inlet fitting of the feed arm for allowing fuel to feed into different groups of feed tubes connected to the feed arm at different points of engine operation.

15. A fuel injector array as recited in claim 14, wherein the scheduling valve is adapted and configured to allow fuel to feed into a first group of feed tubes during an ignition stage.

16. A fuel injector array as recited in claim 14, wherein the scheduling valve is adapted and configured to allow fuel to feed into a second group of feed tubes during an idle stage.

17. A fuel injector array as recited in claim 14, wherein the scheduling valve is adapted and configured to allow fuel to feed into a third group of feed tubes during a cruise and/or takeoff stage.

18. A fuel injector array as recited in claim 14, further comprising a thermal management system including a cooling loop through the common the feed arm.

19. A fuel injector array as recited in claim 14, wherein the plurality of feed tubes and the common feed arm are all surrounded by respective outer heat shields.

* * * * *